United States Patent
Kumar et al.

(10) Patent No.: US 6,240,445 B1
(45) Date of Patent: May 29, 2001

(54) COMPUTER IMPLEMENTED METHOD AND APPARATUS FOR RECEIVING FACSIMILE MESSAGES USING AN INDENTIFIER APPENDED TO A SHARED TELEPHONE NUMBER

(75) Inventors: Siva V. Kumar, Redwood City; Himanshu Choksi, Fremont, both of CA (US)

(73) Assignee: Openware Systems Inc., Redwood City, CA (US)

( * ) Notice: Subject to any disclaimer, the term of this patent is extended or adjusted under 35 U.S.C. 154(b) by 0 days.

(21) Appl. No.: 09/066,268

(22) Filed: Apr. 24, 1998

(51) Int. Cl.$^7$ ............................ G06F 15/16; H04L 12/28; H04M 11/00

(52) U.S. Cl. .................... 709/206; 370/389; 370/390; 370/432; 379/90.01

(58) Field of Search .............. 709/206; 370/389, 370/390, 432; 379/90.01

(56) References Cited

U.S. PATENT DOCUMENTS

| | | |
|---|---|---|
| 4,792,967 | 12/1988 | Ladd et al. . |
| 4,811,111 * | 3/1989 | Kurokawa ............................ 358/440 |
| 4,856,049 * | 8/1989 | Streck ................................. 379/67.1 |
| 5,291,302 | 3/1994 | Gordan et al. . |
| 5,459,584 | 10/1995 | Gordan et al. . |
| 5,471,522 * | 11/1995 | Sells et al. ......................... 379/93.11 |
| 5,521,719 | 5/1996 | Yamada . |
| 5,546,447 * | 8/1996 | Skarbo et al. ......................... 379/142 |
| 5,579,126 | 11/1996 | Otsuka . |
| 5,675,507 | 10/1997 | Bobo, II . |
| 5,790,639 | 8/1998 | Ranalli et al. . |
| 5,822,409 * | 10/1998 | Chang et al. .................... 379/100.06 |

(List continued on next page.)

FOREIGN PATENT DOCUMENTS

| | | |
|---|---|---|
| 0798899A1 | 10/1997 | (EP) . |
| 0812100A2 | 12/1997 | (EP) . |
| 0835011A1 | 4/1998 | (EP) . |
| 93 05603 | 5/1993 | (FR) . |
| 2748178 | 10/1997 | (FR) . |
| WO 92/12591 | 7/1992 | (WO) . |
| WO 96/34341 | 10/1996 | (WO) . |

OTHER PUBLICATIONS

International Search Report for PCT/US 99/06052 dated Jun. 25, 1999.

*Primary Examiner*—Krisna Lim
(74) *Attorney, Agent, or Firm*—Blakely, Sokoloff, Taylor & Zafman LLP

(57) ABSTRACT

Integration of telecommunication message services and other communication services is achieved by notifying a first user of a shared telephone number of a received message (e.g., a facsimile message) by sending a notification message to the first user, e.g., using e-mail, voice and/or data communications. The user may be identified by a unique identifier appended to the shared telephone number. The notification message may comprise an attachment which includes the received message, or the notification message may comprise a computer network address of a location where the received message may be accessed. For the latter case, the computer network address is preferably a universal resource locator (URL) associated with a web page at which the received message may be accessed. The received message may be accessed by allowing the user to view the message, or it may be accessed by allowing an user to down-load the message in any of a number of forms. For example, the message may be down-loaded to hard copy output device, e.g., a receiving facsimile machine or printer, or it may be down-loaded to a storage medium for later retrieval by the user. In still further embodiments, the notification message may comprise the received message itself, e.g., where the received message is relatively small.

31 Claims, 4 Drawing Sheets

U.S. PATENT DOCUMENTS

| | | | |
|---|---|---|---|
| 5,838,461 | * 11/1998 | Hsieh | 358/442 |
| 5,841,550 | 11/1998 | Johnson . | |
| 5,870,549 | * 2/1999 | Bobo, II | 709/206 |
| 5,907,604 | * 5/1999 | Hsu | 379/142 |
| 5,917,615 | * 6/1999 | Reifman et al. | 354/468 |
| 5,940,187 | * 8/1999 | Berke | 358/434 |
| 5,956,390 | * 9/1999 | McKibben et al. | 379/93.07 |
| 5,978,806 | * 11/1999 | Lund | 707/10 |
| 5,991,290 | * 11/1999 | Malik | 370/352 |
| 6,025,931 | 2/2000 | Bloomfield . | |
| 6,067,546 | * 5/2000 | Lund | 707/10 |
| 6,073,165 | * 6/2000 | Narasimhan et al. | 709/206 |
| 6,104,789 | 8/2000 | Lund . | |

* cited by examiner

COMPUTER IMPLEMENTED METHOD AND APPARATUS FOR RECEIVING FACSIMILE MESSAGES USING AN INDENTIFIER APPENDED TO A SHARED TELEPHONE NUMBER

FIELD OF THE INVENTION

The present invention relates to the integration of computer networks and telecommunication services and, more particularly, to the provision of facsimile services, and especially reception, within a computer network.

BACKGROUND

With the present commercialization of a computer network of networks, commonly referred to as the internet, a variety of businesses have started to offer electronic mail (e-mail) and other services for computer users. In general, e-mail provides a rapid and relatively inexpensive means of communications between computer users. In some sectors, e-mail communication is rapidly replacing traditional telephone and facsimile communication.

One problem with e-mail communications, however, is that relatively large files may not be easy to share between users. For example, large files are often included as attachments to e-mail messages. These attachments, if they exceed a certain size, may be stripped off by e-mail gateways, e.g., located at the front-end of a computer network system, before the message is passed to its ultimate destination. As a result, the ultimate recipient may not receive the intended message.

Another problem with e-mail messages transmitted via the internet is that important formatting information may be lost during transmission. For example, tabular data may be reorganized during transmission such that the recipient must reorganize the data into its proper tabular form before the message can be clearly understood. So too, graphic information may be lost and/or distorted during transmission.

Traditional facsimile messages avoid these problems. For example, facsimile messages transmitted across telephone lines retain all the formatting and graphical information of the original message. Also, there is no danger of portions of a facsimile message being stripped off by a gateway prior to reception. Despite these advantages, however, facsimile reception usually requires a dedicated telephone line for connection to the receiving facsimile machine. In a large corporation or other office, it is impractical to provide each member of the office with dedicated facsimile reception capabilities, thus, facsimile services are shared amongst a number of users. This poses a problem where confidential information is to be received by facsimile. There can be no guarantee that the intended recipient of the facsimile message will be the only one who will observe the confidential facsimile message.

Presently, some vendors do offer partial integration of facsimile services and e-mail services. However, in these systems, users must each be assigned individual telephone numbers, thus leading to difficulties where a large number of users must be accommodated. Thus, it would be desirable to provide a system which combines the advantages, while avoiding the disadvantages, of facsimile message and e-mail communications within a single system.

SUMMARY OF INVENTION

The present invention provides, in one embodiment, a method which includes notifying a user of a shared telephone number of a received message destined therefor by sending a notification message to the user. The user may be notified via e-mail, a call to a telephone, cellular telephone, voicemail box and/or pager number or address, or by way of a message to another communication device and/or address. In any event, however, the user is preferably identified by a unique identifier appended to the shared telephone number.

The notification message may comprise an independent message announcing receipt of the facsimile message (e.g., a "you have a fax" message in voice and/or data form), an attachment which includes the facsimile message, or the notification message may comprise a computer network address of a location where the received message may be accessed. For the latter case, the computer network address is preferably a universal resource locator (URL) associated with a web page at which the received message may be accessed. The received message may be accessed by allowing the user to view the message, or it may be accessed by allowing an user to down-load the message in one of a number of forms. For example, the message may be down-loaded to a hard copy output device, e.g., a receiving facsimile machine or printer, or it may be down-loaded to a storage medium for later retrieval by the user. In still further embodiments, the notification message may comprise the received message itself, e.g., where the message is relatively small.

In a further embodiment, the present invention provides a method which includes sharing a single telephone number among a plurality of facsimile users by providing unique identifiers for each of the users appended to the single telephone number. In this embodiment, each of the unique identifiers may be used to identify facsimile messages received at a facsimile reception station associated with the single telephone number as being destined for an associated one of the plurality of facsimile users. The identification of facsimile messages received at the facsimile reception station may be accomplished by mapping the unique identifiers to associated communication addresses of the facsimile users. This may be accomplished, for example, using a look-up table which associates each of the unique identifiers with a corresponding one of the communication addresses of the facsimile users (e.g., an e-mail, telephone, cellular telephone, voicemail box and/or pager number or address). The facsimile users may be notified of a received facsimile message by the transmission of a notification message to the appropriate facsimile user at the user's associated communication address. The notification message may comprise a receipt message, the received facsimile message itself, e.g., where the received facsimile message is relatively small, or it may comprise an attachment which includes the received facsimile message. Preferably, however, the notification message comprises a computer network address (e.g., a URL) specifying a location (e.g., a web page) at which the received facsimile message may be accessed. Upon receipt of the notification message, the user may access the received facsimile message, e.g., by visiting the web page identified by the URL provided in the notification message.

In another embodiment, the present invention provides a computer which includes receiving circuitry for receiving a number of facsimile messages, each destined for different recipient. Coupled to the receiver circuitry is an identification unit which is configured to associate each received facsimile message with an appropriate one of the different recipients. A notification unit is configured to transmit a notification message to the appropriate one of the different recipients upon receipt of a facsimile message destined therefore. The notification message may be in the form of any voice and/or data message. In one case, for example, the notification message may be an alphanumeric message transmitted via e-mail and may comprise a receipt notification (e.g., "You have a fax." or a similar message), the facsimile message itself, an e-mail attachment which includes the facsimile message, or a computer network address (e.g., a URL) which identifies or specifies a location (e.g., a web page) at which the received facsimile message may be accessed. The URL may identify a web page associated with the computer or a web page associated with some other storage device. In general, the identification unit of the computer comprises a mapping function configured to receive a unique identifier associated with an intended one of the different recipients and to provide therefrom a communication address of the intended recipient. The mapping function may be embodied in a look-up table stored in the computer (e.g., in volatile or non-volatile memory). Thus, the notification unit may be configured to transmit the notification message to the communication address provided by the mapping function. The computer may also include a storage archive for received facsimile messages and the notification message may comprise an address of the storage archive at which a particular stored facsimile message may be accessed.

In still another embodiment, the present invention provides a shared facsimile message reception system which includes a computer configured to receive, from a single telephone connection, a plurality of facsimile messages, each destined for different users of the system. The computer may also be configured to provide an indication of such reception to the different users. The shared system further includes an archive of received facsimile messages destined for at least some of the users. In general, the indication of a received facsimile message is provided by way of a notification message transmitted as a communication message (e.g., a voice, data and/or e-mail message). The notification message preferably comprises a computer network address (e.g., a URL) of a storage location associated with the archive of received facsimile messages.

In yet another embodiment, a subscriber-based facsimile message reception system includes a facsimile reception station configured to receive, across a single telephone connection, facsimile messages for a number of subscribers and to notify each subscriber upon receipt of a facsimile message destined therefore. The system may also include an interface for coupling the facsimile message reception station to a computer network, e.g., the internet. In general, the facsimile message reception station includes a mapping function (e.g., as embodied in a look-up table) configured to provide a communication address (or addresses) for one of the system subscribers in response to a indication that a facsimile message destined for that subscriber has been received. Such indication may be provided by a unique identifier associated with the subscriber. The unique identifier may be received as a user input from a transmitting facsimile machine and, preferably, comprises a series of digits appended to a telephone number associated with the intended recipient of the facsimile message.

In yet a further embodiment, a facsimile message reception system may include a station configured to receive, across a single telephone connection, facsimile messages for a number of subscribers. Rather than individually notifying subscribes upon receipt of each individual facsimile message, the station may simply provide for storage of the received messages. Individual users would need to access the station (e.g., via an interactive web page) to retrieve any stored messages. Thus a "store-and-forward-on-demand" process is implemented. Alternatively, the station may be configured to notify subscribers of any received facsimile messages destined therefore at specific times during a day, week, etc. Such a "batch" notification procedure may reduce the bandwidth requirements for the station over that which may be required if individual users were each notified of a facsimile message immediately upon receipt thereof.

These and other features and advantages of the present invention will be apparent from a review of the detail description and its accompanying drawings which follow.

BRIEF DESCRIPTION OF THE DRAWINGS

The present invention is illustrated by way of example, and not limitation, in the figures of the accompanying drawings in which.

DETAILED DESCRIPTION

Described herein is a shared facsimile message reception system which generally employs a computer network, e.g., the internet, which is one exemplary embodiment of the present invention. The system achieves the integration of facsimile services and other communication services, for example by notifying a user of the shared system upon receipt of a facsimile message destined therefor, through a notification message transmitted to that user. The notification message may be transmitted via e-mail (e.g., as a message indicating receipt of the facsimile message) or it may comprise a voice and/or data message transmitted to a telephone, cellular, voicemail box and/or pager number or address associated with the intended recipient of the facsimile message. Shown in FIG. 1 is one example of such a system, however, other configurations of the present invention are possible, including some implementations which merely provide a "store-and-forward-on-demand" functionality explained further below.

Figure 1:
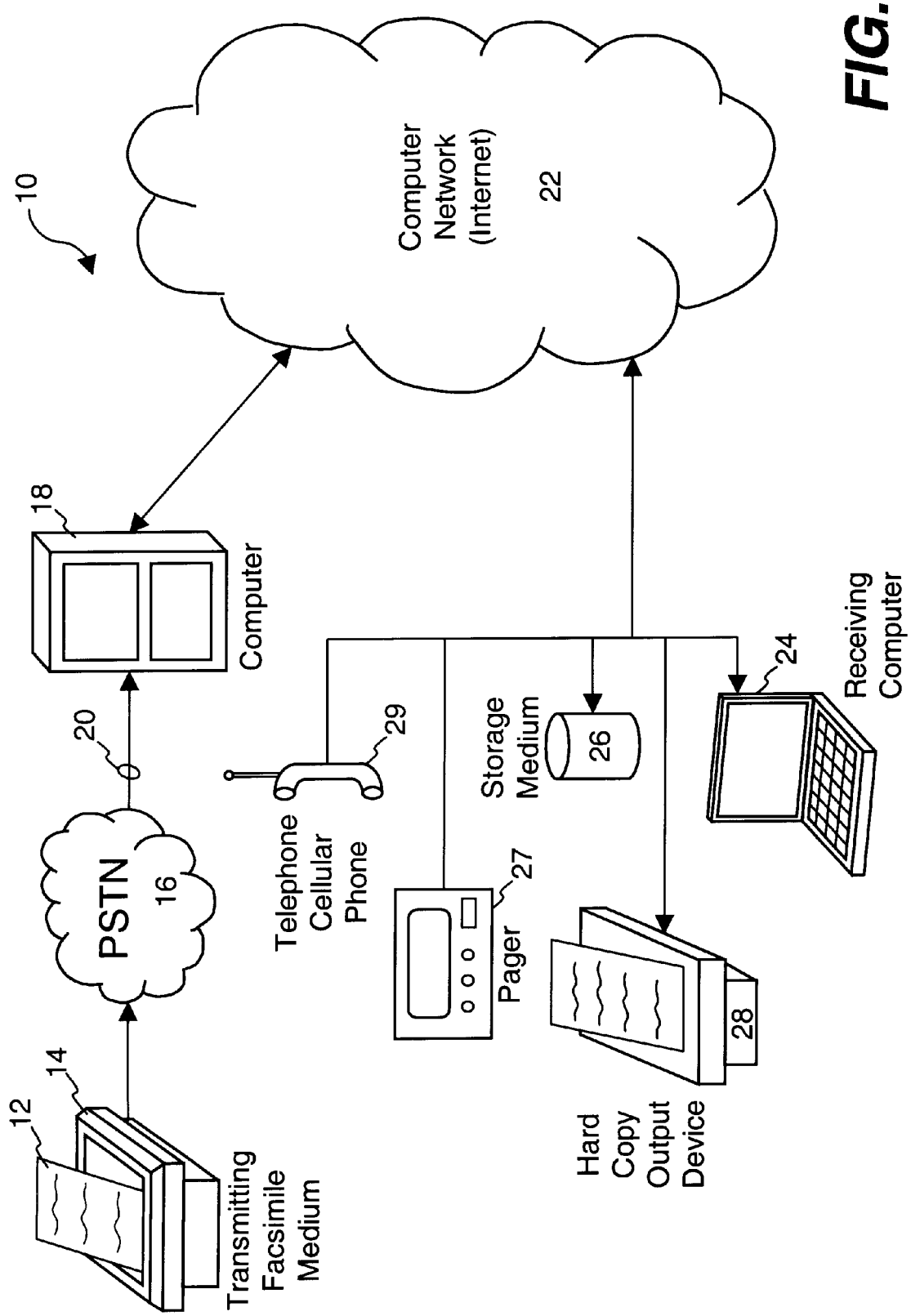
FIG. 1 illustrates a facsimile message reception system configured in accordance with an embodiment of the present invention.

Facsimile message reception system 10 of FIG. 1 integrates traditional facsimile transmission and reception means with other conventional communication transmission and reception means and may make use of the computer network of networks generally referred to as the internet. The operation of facsimile message reception system 10 may be described briefly as follows. A facsimile message 12 is transmitted from a transmitting facsimile machine 14 across the public switched telephone network (PSTN) 16 to a computer 18 where the facsimile message 12 is received. Computer 18 may provide storage and forwarding services for a number of subscribers of facsimile message reception system 10 and may further allow the use of a single connection 20 from PSTN 16 to be shared amongst a large number of subscribers or users. Multiple such connections 20 may be provided as needed to accommodate even more users.

Upon receipt of a facsimile message 12, computer 18 forwards a notification message which indicates such reception to the intended recipient. The notification message may be transmitted to a communication device or address such as an e-mail address (e.g., associated with a subscriber e-mail account), a telephone, cellular or pager number or address, or even combinations of these devices and/or addresses. The notification message may be an alpha-numeric message (e.g., as may be provided to an e-mail or pager address) and/or a voice message (e.g., as may be transmitted to a telephone, cellular or voicemail box address.

The notification message may be transmitted across a computer network 22 (e.g., the internet) to the user. Even in the case of a voice message notification message, the internet may be employed, e.g., thus allowing for reduced telephone access charges where the call to the communication address of the intended recipient of the facsimile message from computer 18 may otherwise be a long distance or other toll call. Software and other applications which allow for the packaging and transmission of such voice messages across the internet (or other computer network 22) are known in the art and need not be discussed further herein.

Upon receipt of the notification message, the user (i.e., the intended recipient of the facsimile message received by computer 18) may choose to have facsimile message 12 down-loaded to a receiving computer 24, a storage medium 26, or a hard copy output device (e.g., a facsimile machine or printer) 28 and/or a combination of these devices. Storage medium 26 may, for example, be included within the receiving computer 24. In such a case, storage medium 26 may comprise a hard disk drive or a floppy disk. In some cases, storage medium 26 will be read/write memory associated with receiving computer 24. In other cases, after being received by computer 24, the message may be down-loaded to hard copy output device 28. In other cases, the facsimile message may be down-loaded in the form of an alpha-numeric message to pager 27 (e.g., even as part of the notification message itself). Or, the notification message may be the only message provide to pager 27 (e.g., in which case a user would need to retrieve the facsimile message 12, possibly using one of the methods described herein). In still other cases (or even concurrently with other retrieval methods), the facsimile message may be down-loaded as a voice message (e.g., a computer-synthesized voice message) to telephone/cellular telephone 29. This may be possible for cases where the facsimile message 12 is relatively small and can be converted from a received image to a voice message (e.g., by first passing the received image through an optical character recognition process and then applying the output of that process to a voice synthesis process) at computer 18. More often, however, it is envisioned that any messages passed to telephone/cellular telephone 29 will be voice notification messages (e.g., "You have a fax.") that alert the user to the fact that facsimile message 12 has been received by computer 18 and, thus, prompt the user to access computer 18 to retrieve the received facsimile message (e.g., using the techniques described below).

One interesting advantage provided by the present invention is the ability to display color information contained in the original facsimile message 12 to the ultimate recipient, even if that recipient does not have a color printer or color facsimile machine. For example, if facsimile message 12 includes color information (e.g., in the form of graphical image or red-line mark-ups), then computer 18 will store this color information directly. Because facsimile message 12 is received as an image file (e.g., in any one of a number of standard image file formats such a TIFF, JPEG, GIFF, etc.) at computer 18, all of the original color information contained therein is also stored. When the intended recipient later access the stored facsimile message (e.g., by visiting a web page at which the stored message (now in image format) may be retrieved, all of that original color information is displayed as part of the stored image. So long as the user has a color display device associated with computer system 24, this color information is preserved for viewing. Of course, if the user also has a hard copy output device 28 capable of reproducing the color information contained in the image of the received facsimile message, the down-loaded image may be printed in color.

The notification message transmitted to the user may comprise an attachment which includes the facsimile message 12, or the notification message may comprises a computer network address of a location where the received facsimile message 12 may be accessed. For the latter case, the computer network address is preferably a URL associated with a web page at which the received facsimile message may be accessed. The received facsimile message may be accessed by allowing the user to view the message, or it may be accessed by allowing the user to down-load the message in one of a number of forms. For example, the message may be down-loaded to hard copy output device 28, e.g., a receiving facsimile machine or printer, or it may be down-loaded to storage medium 26 for later retrieval by the user. In still further embodiments, the notification message may comprise the received facsimile message itself, e.g., where the facsimile message is relatively small.

Figure 2:
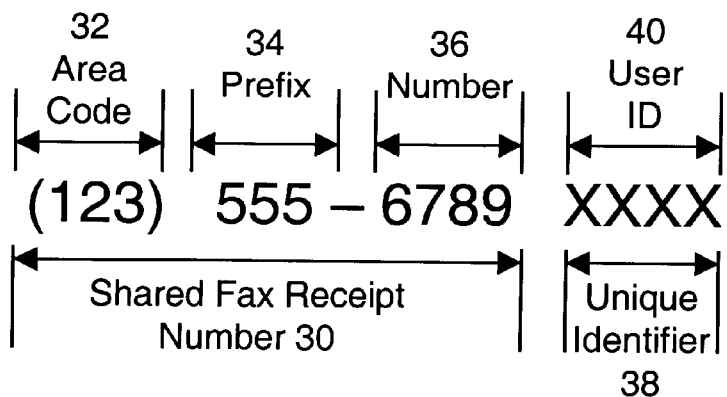
FIG. 2 illustrates a telephone number including a unique identifier for a user of the facsimile message reception system shown in FIG. 1.

In one sense then, the present invention can be considered to provide for the sharing of a single telephone number among a plurality of facsimile users while still preserving the confidentiality of a dedicated line system. To illustrate, consider that in order to allow the use of a signal connection 20 to PSTN 16, some means of multiplexing must be provided. One such multiplexing means is illustrated in FIG. 2. A number of users of facsimile message reception system 10 share a single fax receipt number 30. In general, fax receipt number 30 is made up of a shared telephone number, e.g., the familiar 10 digit telephone number as used in the United States or a telephone number having more or fewer digits as may be used in other countries or during international dialing, for example. As such, the shared fax receipt number includes an area code field 32, a prefix field 34 and a number field 36. Appended to the end of the shared fax number 30 is an unique identifier 38 which can be made up of, for example, four digits. In such a case, up to 10,000 different users of facsimile message reception system 10 may share a single fax receipt number 30, thus representing a single connection 20 to PSTN 16. Other users may share additional shared facsimile receipt numbers, and so on. Unique identifier 38 may, in general, be thought of a user ID field 40.

The inclusion of a multiple digit unique identifier 38 at the end of a standard 10 digit telephone number enables a single fax receipt number 30 to be shared by many subscribers, thus enabling telecommunication store and forward services over the internet. In general, the transmitting facsimile machine 14 is used to dial the shared fax receipt number 30 plus the unique identifier 38, thus providing a unique number identifying the intended recipient of facsimile message 12. As a conventional facsimile machine, transmitting facsimile 14 will await the reception of a facsimile protocol tone sequence prior to transmitting facsimile message 12.

PSTN 16 process the first 10 digits of the dialed number, representing the shared fax receipt number 30, and completes the telephone connection to computer 18. At this point, facsimile machine 14 has not yet completed the dialing sequence and has not yet started transmission of the facsimile message 12. As facsimile machine 14 completes the dialing sequence by transmitting the unique identifier 38, computer 18 parses the unique identifier 38 and identifies the intended recipient of facsimile message 12. Computer 18 may then transmit the required facsimile protocol tone sequence to enable facsimile machine 14 to begin transmission of facsimile message 12. Computer 18 then receives the facsimile message 12 in the conventional fashion (e.g., using a facsimile reception software package).

Upon receipt of the facsimile message 12, computer 18 provides notification of such reception to the intended recipient by using the unique identifier 38. In general, the unique identifier 38 is mapped to a communication address of the intended recipient (e.g., an e-mail, telephone, cellular, pager or other communication address or number), as stored at computer 18, and a notification message is transmitted to that address. The facsimile message 12 may be sent within the notification message itself, as an attachment thereto, or, preferably, it may be stored (e.g., as a web page or, more particularly, as an image viewable or otherwise accessible at a web page) and the notification message may comprise a computer network address (e.g., a URL) indicating where the received facsimile message may be accessed. Upon receipt of the notification message, and depending on its format, the user (i.e., the intended recipient of the facsimile message 12) may receive the facsimile message 12 directly (e.g., as an attachment to an e-mail or pager message) or may visit the web site indicated by the URL or other computer network address transmitted as part of the notification message.

In those cases where the PSTN 16 does not complete the call to computer 18 fast enough to enable computer 18 to detect all the digits associated with unique identifier 38, computer 18 may generate an exception and, for example, may respond to facsimile machine 14 with a busy signal. In such a case, facsimile machine 14 would execute a redial sequence until properly connected. In other cases, e.g., where a very slow connection is provided by PSTN 16, the entire fax receipt number 30 and unique identifier string 38 may be manually input at transmitting facsimile machine 14. Any required pauses at the end of the fax receipt number 30 could be included to ensure that a connection to computer 18 is established before the unique identifier 38 is transmitted.

In this embodiment then, each of the unique identifiers 38 may be used to identify various ones of facsimile messages received at a facsimile message reception station associated with a single telephone number as being destined for associated ones of a plurality of facsimile users. The identification of facsimile messages received at the facsimile message reception station (e.g., computer 18) may be accomplished by mapping the unique identifiers 38 to associated communication addresses of the facsimile users. This may be accomplished, for example, using a look-up table which associates each of the unique identifiers 38 with a corresponding one of a number of communication addresses of the facsimile users. The facsimile users may then be notified of a received facsimile message by the transmission of a notification message to the appropriate facsimile user at the user's associated communication address. As indicated above, the notification message may comprise a message indicating receipt of the facsimile message, e.g., "You have a fax.", the received facsimile message itself, e.g., where the received facsimile message is relatively small, or it may comprise an attachment which includes the received facsimile message. Preferably, however, the notification message comprises a computer network address (e.g., a URL) specifying a location (e.g., a web page) at which the received facsimile message may be accessed. Upon receipt of the notification message, the user may access the received facsimile message, e.g., by visiting the web page identified by the URL provided in the notification message.

Computer 18 thus may include receiving circuitry for receiving a number of facsimile messages 12, each destined for a different recipient. Coupled to the receiving circuitry is an identification unit (described above as a mapping function, e.g., a look up table) which is configured to associate each received facsimile message 44 with an appropriate one of the different recipients. A notification unit within computer 18 may be configured to transmit a notification message to the appropriate recipient upon receipt of a facsimile message destined therefore. In one embodiment, the notification message is transmitted via e-mail and may comprise the facsimile message itself, an e-mail attachment which includes the facsimile message, or a computer network address (e.g., a URL) which identifies or specifies a location (e.g., a web page) at which the received facsimile message may be accessed. The URL may identify a web page associated with the computer or a web page associated with some other storage device. In other cases though, the notification message may be a voice and/or data message transmitted to a telephone, cellular and/or pager address or number. Computer 18 may also include a storage archive for received facsimile messages and the notification message may comprise an address of the storage archive at which a particular stored facsimile message may be accessed.

Figure 3:
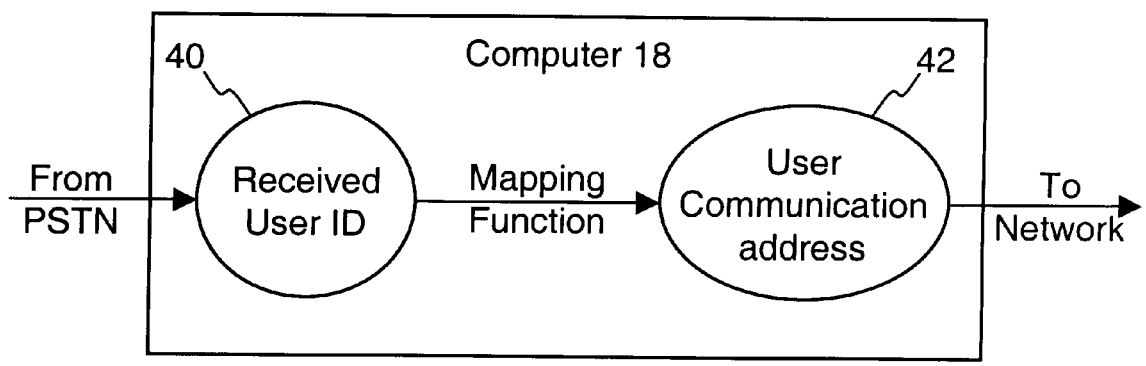
FIG. 3 illustrates one embodiment of a mapping function provided by a computer associated with the facsimile message reception system of FIG. 1.

FIG. 3 illustrates the mapping function provided by computer 18. In general, the user ID 40 is received from PSTN 16 and mapped to an associated user communication address 42. The user communication address 42 allows a notification message to be transmitted to the intended facsimile message recipient, e.g., via computer network 22.

Figure 4:
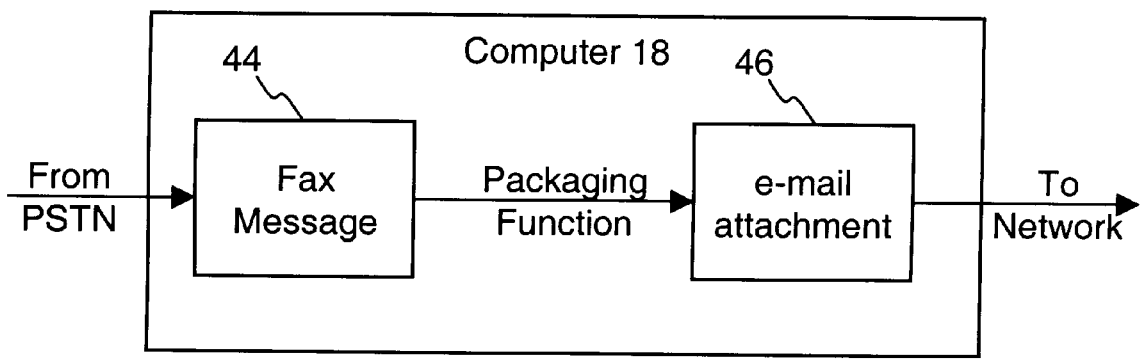
FIG. 4 illustrates a packaging function provided by a computer associated with the facsimile message reception system of FIG. 1.

FIG. 4 shows a packaging function which may be provided at computer 18. In this case, the received facsimile message 44 from PSTN 16 is packaged as an e-mail attachment 46 prior to transmission to a user across computer network 22. In some cases, instead of an e-mail attachment, the fax message 44 may be directly included within the notification message itself. Alternatively, the notification message may be a voice message transmitted to a telephone, cellular and/or voicemail box address or number.

Figures 5, 6:
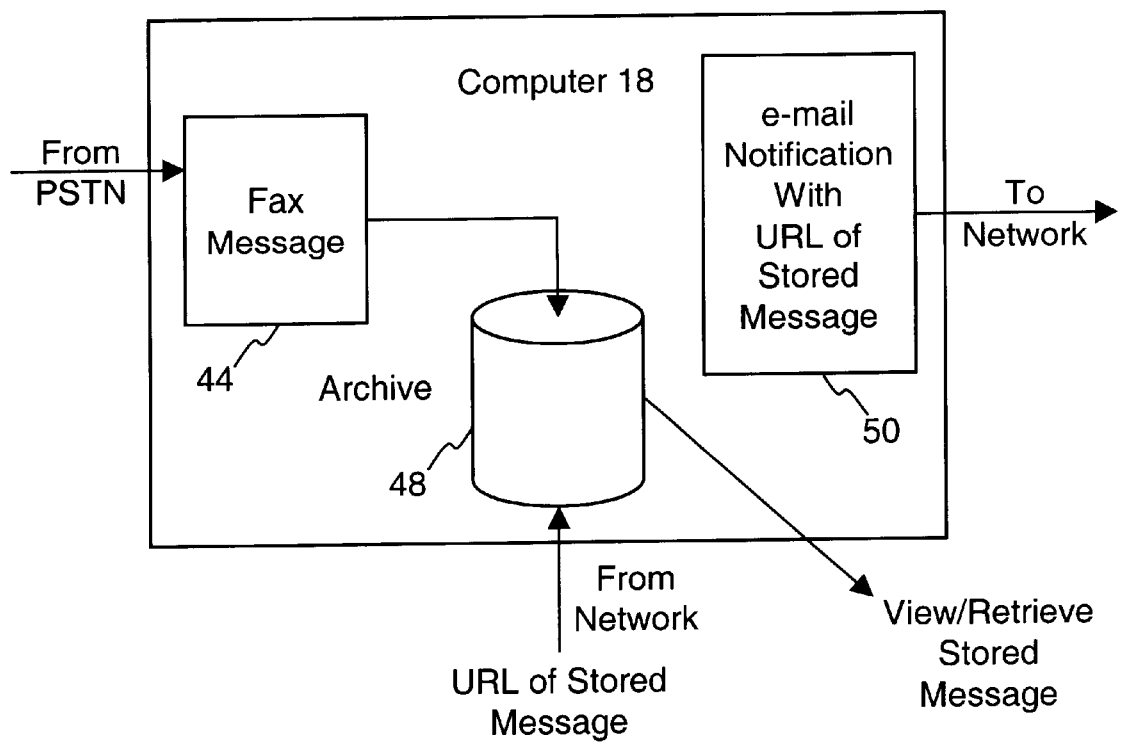
FIG. 5 illustrates a storage and notification function provided by a computer associated with the facsimile message reception system of FIG. 1.
FIG. 6 illustrates a look-up table which may be used to implement the mapping function for the computer illustrated in FIG. 3.

FIG. 5 shows one exemplary operation of computer 18 when the received facsimile message 44 is stored in an archive 48, e.g., a hard disk drive or other storage device. Upon such receipt, an e-mail notification message 50, including the URL of a web page at which the stored facsimile message 44 may be accessed, is transmitted to the user, e.g., via computer network 22. Upon receipt of the e-mail notification message 50, the user may access the stored facsimile message 44 by visiting the web page associated with the URL provided in the notification message. In general, that URL will correspond to a storage location within archive 48. In some cases, however, storage archive 48 may be located separate from computer 18. Upon accessing the web page associated with the storage location of the facsimile message 44, e.g., using a personal identification number which may be the same as the user's unique identifier 38, the facsimile message may be viewed and/or otherwise retrieved by the user.

One embodiment of the mapping function provided by computer 18 is illustrated in FIG. 6. In this example, a look-up table 52 which associates received user IDs with user communication addresses is provided. Look-up table 52 may be stored in volatile or non-volatile memory. In general, as computer 18 receives the unique identifier digits 38, look-up table 52 is accessed to provide the user communication address associated with the unique identifier 38. Conventional look-up table parsing techniques may be used to provide rapid access to look-up table 52. As shown, the communication address may be a user e-mail address and/or a number associated with a telephone, cellular and/or pager account of the user.

Figure 7:
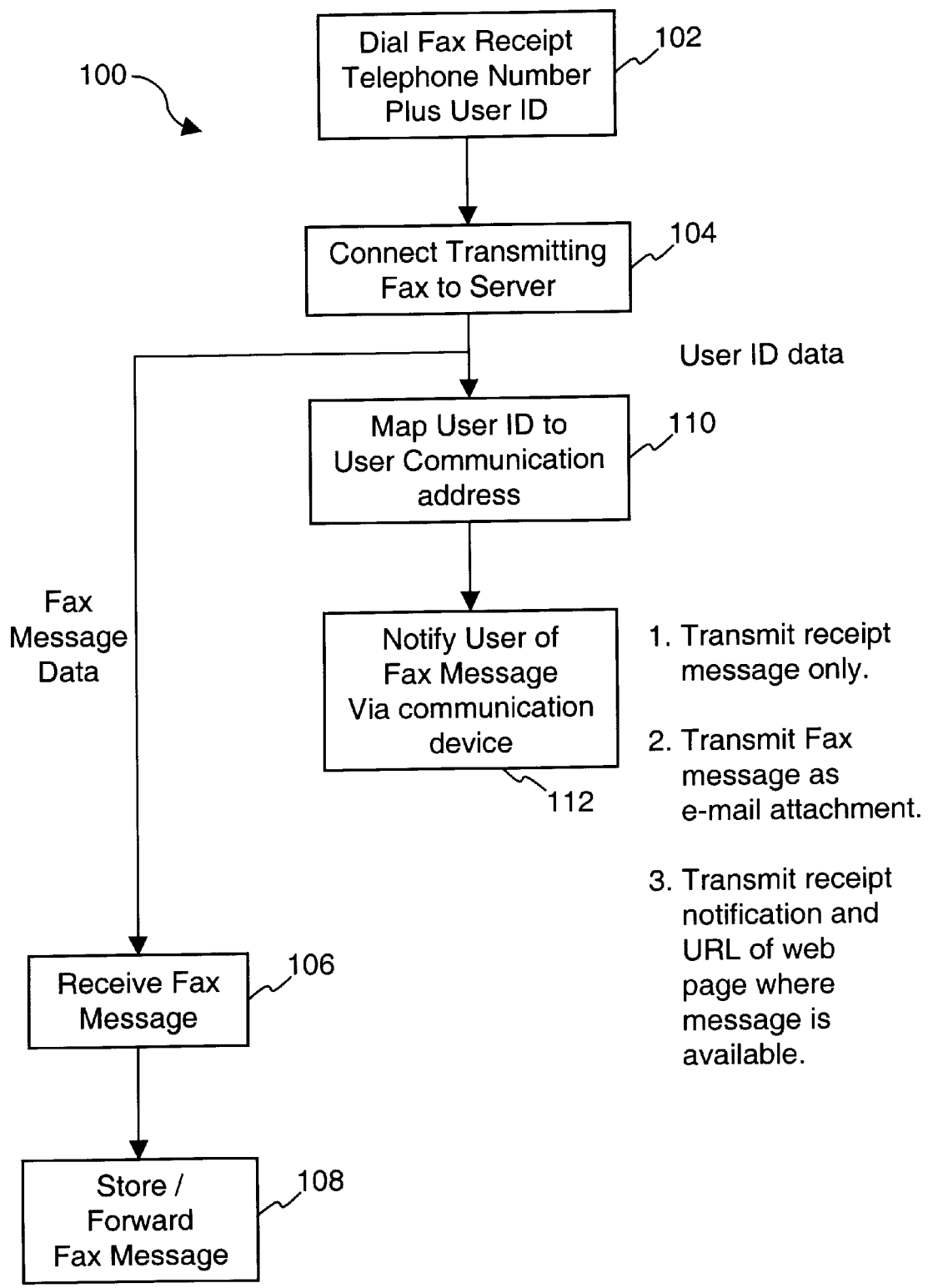
FIG. 7 is a flow diagram presenting one method of notifying a user of a facsimile message reception according to one embodiment of the present invention.

FIG. 7 illustrates a process 100 for using a facsimile message reception system in accordance with one embodiment of the present invention. At step 102, a transmitting facsimile machine dials up the shared facsimile receipt telephone number and appends the unique identifier associated with the intended recipient of the facsimile message. At step 104, based on the dialed number, the transmitting facsimile machine is connected to a computer which provides the store and forward services discussed above. As indicated, this connection may be provided by the public switched telephone network or by a private telecommunications network.

Once the connection has been established, facsimile message data may be received by the computer at step 106. The received facsimile message may be stored and reformatted (e.g., as an image stored at a web page accessible by a browser application or other software package located at computer 24) at step 108 in accordance with the procedure discussed above.

User identification data which is also transmitted by the transmitting facsimile machine is received at the computer and, at step 110, is mapped to the associated user communication address. The user communication address is used, at step 112, to notify the user of the receipt of the facsimile message, e.g., by e-mail. As indicated, the notification message may indicate the receipt of the message only, in which case the user may have to take other steps to receive a copy of the facsimile message, or the notification message may include the facsimile message, e.g., as an e-mail attachment. Preferably, however, the notification message will include the URL of a web page where the message is available for access.

Thus, a shared facsimile message reception system has been described. Although the present invention has been discussed with reference to specific illustrated embodiments thereof, the generality of the present invention should in no way be limited thereby. For example, in addition to the above-described embodiments, a subscriber-based telecommunications message (e.g., voice or data) reception system configured in accordance with the present invention may include a message reception station configured to receive voice and/or data messages for a number of subscribers and to notify each subscriber upon receipt of a message destined therefore. The system may also include an interface for coupling the message reception station to a computer network, e.g., the internet. In general, the message reception station may include a mapping function (e.g., as embodied in a look-up table) configured to provide a communication address for one of the system subscribers in response to a indication that a message destined for that subscriber has been received. Such indication may be provided by an unique identifier associated with the sub-scriber. The unique identifier may be received as a user input and, preferably, comprises a series of digits appended to a telephone number associated with the message reception station.

Alternatively, the facsimile message reception system may include a station (e.g., computer 18) configured to receive, across a single telephone connection 20, facsimile messages for a number of subscribers. Rather than individually notifying subscribers upon receipt of each individual facsimile message 12, the station may simply provide for storage of the received messages. Individual users would need to access the station (e.g., via an interactive web page) to retrieve any stored messages. The web page may be accessed, for example, upon successful receipt of a personal identification number associated with the intended recipient (s) of the facsimile message. Thus a "store-and-forward-on-demand" process may be implemented. Alternatively, the station may be configured to notify subscribers of any received facsimile messages destined therefore at specific times during the day, week, etc. Such a "batch" notification procedure may reduce the bandwidth requirements for the station over that which may be required if individual users were each notified of a facsimile message immediately upon receipt thereof. To preserve this generality then, the present invention should only be measured in terms of the claims which follow.

What is claimed is:

1. A method of providing notification to an intended recipient of a message, the method comprising:
   determining that a first message has been transmitted for delivery to a first user of a plurality of users of a shared telephone number, the first user being identified by a unique identifier appended to the shared telephone number; and
   sending a second message to the first user to notify the first user of the first message.

2. A method as recited in claim 1, wherein the second message is sent to the first user via e-mail.

3. A method as recited in claim 1, wherein the second message is sent to the first user as a voice message.

4. A method as recited in claim 1, wherein the second message is sent to the first user as an alpha-numeric message.

5. A method as recited in claim 1, wherein the second message is sent to the first user via telephone.

6. A method as recited in claim 1, wherein the second message is sent to the first user via cellular telephone.

7. A method as recited in claim 1, wherein the second message is sent to the first user via pager.

8. A method as recited in claim 1, wherein the second message comprises an attachment which includes the first message.

9. A method as recited in claim 1, wherein the second message comprises a computer network address of a location where the first message may be accessed.

10. A method as recited in claim 9, wherein the computer network address comprises a universal resource locator (URL).

11. A method as recited in claim 10, wherein the first message may be accessed by viewing the first message only.

12. A method as recited in claim 1, wherein the second message comprises the first message.

13. A method of providing notification to an intended recipient of a facsimile message, the method implemented in a shared computer-based facsimile system, wherein a common connection is used to couple the system to a network, the method comprising:

receiving the facsimile message at a computer, the facsimile message having been transmitted to a telephone number of the facsimile system, wherein the telephone number is shared by a plurality of users of the facsimile system;

in response to receiving the facsimile message, recognizing at the computer a unique identifier appended to the telephone number;

identifying a communication address of the intended recipient of the facsimile message using the unique identifier; and transmitting a notification message to the intended recipient of the facsimile message at the communication address.

14. A method as recited in claim 13, wherein the notification message is sent to the intended recipient via e-mail.

15. A method as recited in claim 13, wherein the notification message is sent to the intended recipient as a voice message.

16. A method as recited in claim 13, wherein the notification message is sent to the intended recipient as an alpha-numeric message.

17. A method as recited in claim 13, wherein the notification message is sent to the intended recipient via telephone.

18. A method as recited in claim 13, wherein the notification message is sent to the intended recipient via cellular telephone.

19. A method as recited in claim 13, wherein the notification message is sent to the intended recipient via pager.

20. A method as recited in claim 13, wherein the notification message comprises an attachment which includes the facsimile message.

21. A method as recited in claim 13, wherein the notification message comprises a computer network address of a location where the received facsimile message may be accessed.

22. A method as recited in claim 13, wherein the computer network address comprises a universal resource locator (URL).

23. A method as recited in claim 13, wherein the received facsimile message may be accessed by viewing the facsimile message only.

24. A method as recited in claim 13, wherein the notification message comprises the facsimile message.

25. A method as recited in claim 13, wherein said identifying is accomplished using a lookup table which associates each unique identifier of each user of the facsimile system with that user's corresponding communication address.

26. A method as recited in claim 25, wherein the communication address comprises an e-mail address.

27. A method as recited in claim 25, wherein the communication address comprises a telephone number.

28. A method as recited in claim 25, wherein the communication address comprises a cellular telephone number.

29. A method as recited in claim 25, wherein the communication address comprises a pager account number.

30. An apparatus for providing notification to an intended recipient of a message, the apparatus comprising:

means for determining that a first message has been transmitted for delivery to a first user of a plurality of users of a shared telephone number, the first user being identified by a unique identifier appended to the shared telephone number; and means for sending a second message to the first user to notify the first user of the first message.

31. A computer in a facsimile system shared by a plurality of users, the computer comprising:

a processor; and a storage device including instructions which configure the computer to provide notification to an intended recipient of a facsimile message, the instructions including instructions which, when executed by the processor, cause the computer to:

recognize, in response to receiving the facsimile message, a unique identifier appended to a telephone number shared by a plurality of users of the facsimile system;

identify a communication address of the intended recipient using the unique identifier; and transmit a notification message to the intended recipient at the communication address.

* * * * *

UNITED STATES PATENT AND TRADEMARK OFFICE
CERTIFICATE OF CORRECTION

PATENT NO.    : 6,240,445 B1  
DATED         : May 29, 2001  
INVENTOR(S)   : Kumar et al.

Page 1 of 1

It is certified that error appears in the above-identified patent and that said Letters Patent is hereby corrected as shown below:

<u>Title page,</u>  
Item [54], delete "INDENTIFIER" and replace with -- IDENTIFIER --.

Signed and Sealed this

Twenty-sixth Day of November, 2002

*Attest:*

*Attesting Officer*

JAMES E. ROGAN  
*Director of the United States Patent and Trademark Office*

UNITED STATES PATENT AND TRADEMARK OFFICE
CERTIFICATE OF CORRECTION

PATENT NO.    : 6,240,445 B1
DATED         : May 29, 2001
INVENTOR(S)   : Kumar et al.

It is certified that error appears in the above-identified patent and that said Letters Patent is hereby corrected as shown below:

<u>Title page,</u>
Item [73], Assignee, delete "Openware" and replace with -- Openwave --.

Signed and Sealed this

Thirty-first Day of December, 2002

JAMES E. ROGAN
*Director of the United States Patent and Trademark Office*